United States Patent [19]

Arieh et al.

[11] Patent Number: 4,563,020
[45] Date of Patent: Jan. 7, 1986

[54] SKI VIBRATION DAMPER

[75] Inventors: Simon Arieh; Guy Courvoisier, both of Geneva, Switzerland

[73] Assignee: Skis Dynastar SA, Sallanches, France

[21] Appl. No.: 503,350

[22] Filed: Jun. 10, 1983

[30] Foreign Application Priority Data

Jun. 11, 1982 [CH] Switzerland ............ 3619/82

[51] Int. Cl.$^4$ ............................................. A63C 5/07
[52] U.S. Cl. ................................ 280/602; 188/378
[58] Field of Search .............. 280/602, 604, 610; 188/378, 379; 248/638

[56] References Cited

U.S. PATENT DOCUMENTS

| 3,113,640 | 12/1963 | Stedman | 188/378 |
| 3,537,717 | 11/1970 | Caldwell | 280/602 |
| 3,774,730 | 11/1973 | Maddux | 188/379 |
| 4,018,454 | 4/1977 | Burkart | 280/602 |
| 4,050,665 | 9/1977 | Matthews et al. | 248/638 |
| 4,203,596 | 5/1980 | Nagamoto | 273/73 J |
| 4,405,149 | 9/1983 | Piegay | 280/602 |
| 4,438,946 | 3/1984 | Piegay | 280/602 |

FOREIGN PATENT DOCUMENTS

| 1249018 | 8/1967 | Fed. Rep. of Germany . |
| 2747084 | 4/1979 | Fed. Rep. of Germany . |
| 2820649 | 11/1979 | Fed. Rep. of Germany . |
| 1142684 | 9/1957 | France . |
| 2382245 | 9/1978 | France . |
| 2383680 | 10/1978 | France . |
| 771048 | 3/1957 | United Kingdom . |

Primary Examiner—Richard A. Bertsch
Attorney, Agent, or Firm—Karl F. Ross; Herbert Dubno

[57] ABSTRACT

A ski damper which can be inserted into a hole formed in the ski blade comprises a pair of housing portions which can be joined together from opposite sides of the blade to define a receptacle in which a disk is shiftable between a pair of foam rings. The disk is composed of a material having a specific gravity greater than 10 and has a thickness/diameter ratio between 1/3 and 1/30 and damps primarily vibrations in the frequency range between 100 and 200 Hz.

17 Claims, 5 Drawing Figures

SKI VIBRATION DAMPER

FIELD OF THE INVENTION

Our present invention relates to a ski vibration damper and, more particularly, to a damping device capable of damping the vibration of a ski and especially vibration in the frequency range between about 100 and about 200 Hz.

BACKGROUND OF THE INVENTION

It is known that the vibration of a ski can represent a significant disadvantage to the skier, not only because such vibration generates sounds which are annoying and may limit the control that a skier has on the skiing action, but because the vibration is a significant factor in the tiring of the skier.

For this reason it has been proposed heretofore to provide a ski damper (see German patent document DE-A 2,747,084) in which an oscillating mass is disposed in a polymeric foam filling a space containing the damper on a ski.

Other damping devices for vibration have been provided heretofore, although not necessarily in conjunction with skiis, wherein an oscillating mass is provided in conjunction with a damping mass of elastomeric material. Reference may be had, for example, to German patent document DE-B 1,249,018.

Furthermore, in German patent document DE-A 1,478,110 and in U.S. Pat. No. 4,018,454, damper structures are described for ski vibration which also utilize the principle of absorption of oscillating energy.

Surprisingly, none of the documents mentioned, nor any others relating to the damping of ski vibrations, to the best of our knowledge, deals with the dimensioning or the specific structural configurations of a damper to damp the particular range of frequencies to which the present invention is specifically directed. Presumably, since it is known that the modes of vibration of a ski are numerous and complex, the approach generally has been in the past to accept any frequency attenuation in the range of several Hz to several thousands Hz which may be generated in the ski.

In other words, it presumably has been acceptable heretofore to disregard the limited range of frequencies for which attenuation was possible with any single vibration damper heretofore because to do otherwise would require the application of a number of absorbers of different types for a given ski, something which is unacceptable because of the resulting interference with the skiing action.

Thus it has not been possible heretofore to obtain a total damping over the entire range of frequencies and this has created the problem of selection of the frequency to be attenuated.

These efforts have developed in two directions. On the one hand, there have been suggestions as to the damping of low frequency vibrations, generally vibrations below about 50 Hz, utilizing oscillating bodies of the type described previously. The second approach has been that of modifying the composition of the ski or the structure of the ski itself to enable the absorption of relatively high frequencies, generally frequencies of about 500 Hz and higher. The damping of the low frequency vibrations require comparatively heavy and large unit and to the extent to which benefit is obtained by damping these low frequency vibrations, there is a comparable degree of inconvenience resulting from the size in mass of the damping unit which is required. The damping of relatively high frequencies is obtained by an appropriate choice of the material used in constructing the ski and by the mode of fabrication. Mention may also be made of the fact that it is the low frequency vibrations which are most noticeable and even perceptible to the eye and the ones which are most strongly attenuated by contact of the ski with the snow.

Until now there has been no satisfactory solution to the problem of intermediate frequency vibrations, namely, vibrations in the range of 100 to about 500 Hz.

We have discovered, quite surprisingly, that these vibrations appear to be amplified by contact of the ski with the snow, especially during braking or turning.

This particular range of vibrational frequencies, moreover tend to reduce the purchase of the ski on the snow, especially when the snow is hard, and on ice, thereby interfering with the precision with which the ski can be guided and the control which the skier has of the skiing operation. Since greater muscular effort is required to maintain the ski in its direction of travel, this vibrational frequency range contributes to the exhaustion of the skier.

Indeed, we have found that one of the significant failures of earlier damping approaches to ski vibrations has been the inability to deal with the vibrations in the middle frequency range between 100 to 500 Hz and the lack of any significant contribution to the solution of the problem over the last 20 years or more since the vibration problem was first considered.

OBJECTS OF THE INVENTION

It is the principal object of the present invention to provide a device which overcomes the drawbacks enumerated above and, specifically, permits damping of the intermediate frequency range.

Another object of this invention is to provide a ski damper most effective at an intermediate frequency range but which is of comparatively light weight and small size and hence affords a minimum of inconvenience to the skier.

Yet another object of this invention is to provide a ski having a ski damper for the purposes described which is relatively simple, reliable and of comparatively small dimensions and weight.

SUMMARY OF THE INVENTION

These objects and others which will become apparent hereinafter are attained, in accordance with the present invention which comprises a ski damper mounted on one of the ends of the ski and preferably at the front or upturned end thereof. The damper comprises a receptacle mounted at this end of the ski and provided with guide means defining an oscillation axis substantially perpendicular to that of the ski for an oscillating mass which is constituted by a disk having a thickness/diameter ratio between 1/3 and 1/30 and composed of a material having a specific gravity greter than 10, the ratio between the axial dimension of this mass and axial demension of the oscillating assembly being at most 1/4, this assembly being able to reduce the acceleration contributing to these vibrations by a mean factor of at least 2 if the frequency range between about 100 and 200 Hz. According to the invention, this assembly includes the oscillating member and restoring means in the form of polymeric foam annuluses disposed on opposite sides of this mass of disk.

It is indeed surprising that such a device, for comparatively small dimensions and weight, is capable of damping vibration frequencies over a wide frequency range, generally in the intermediate portion of the frequency spectrum. In other words, considering the small dimensions and weight, the damping effect as to frequency range and even as to the energy damped is truly remarkable and surprising.

The efficiency of the device in spite of the use of a relatively small mass appears to be explainable in part by the fact that the mass can be subjected to a significantly larger number of vibrations per unit time in its energy dissipating mode so that the total displacement of the mass in energy dissipation over a given period of time is considerable.

Another advantage of the device of the invention is its simplicity and low cost, and the ease with which it can be mounted upon the ski.

For example, if the receptacle is made in two parts which are attached together by screwthread means or other interfitting means, they can be inserted into a bore in the ski blade from opposite sides and held together, receiving the mass and the foam polymer damping members and restoring members between them.

Another advantage of the invention is that the mass of the elastic means, forming the force restoring elements, is negligible so that these elements do not contribute a natural frequency of vibration which can interfere with the oscillation of the disk. By appropriate selection of the material of the disk and a foam of low specific gravity, the assembly can have the damping frequency range desired and with a small amplitude of oscillation, can damp accelerations exceeding 100 g, taking into consideration the considerable heteresis of the elastic character of the film. Consequently, with a very small mass, even if the energy applied exceeds the ability of the device to absorb this energy, there will be little likelihood of damage to the receptacle in which the oscillator is received.

It should be noted that the small dimensions may even permit complete or at least partial integration of the oscillating assembly within the outline of a normal ski.

According to a more specific feature of the invention, the axial dimension of the oscillating assembly is at least equal to 4 times the thickness of the thinnest portion of the ski. The thickness/diameter ratio of the oscillating disk is preferably between 1/6 and 1/20 and the mass of this disk should be at most equal to 15 grams.

A ski equipped with the damper according to the invention preferably has the device received within the thickness of the blade of the ski at the leading end thereof and the receptacle can comprise two cup-shaped members having external wheels which are cylindrical and defined by a generatrix parallel to the axis of oscillation and externally conforming to the configuration of a hole formed in the blade of the ski.

The upper and lower walls of the receptacle can have laterally extending flanges which taper in thickness toward the upper and lower surfaces of the ski respectively.

The height of the portion of the receptacle received in the thickness of the blade and the portion projecting below the under side of the blade is of the order of 30% to 50% of the total height of the receptacle. The flanges can seal against the surfaces of the ski to prevent snow from packing between the receptacle and the ski.

The flanges can be composed of an elastically deformable material for this purpose and the screw means can draw the sealing lips formed by these flanges against the opposite surfaces of the ski.

The housing or receptacle can have a central post coaxial with the axis of oscillation of the disk and on which the disk rides, preferably via the intermediary of a sliding bushing.

The total weight of the damping device need not exceed 30 grams and the preferred density of the polymeric foam which is used as the damping material and as the force restoring mean is less than 80 kg per $m^3$.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
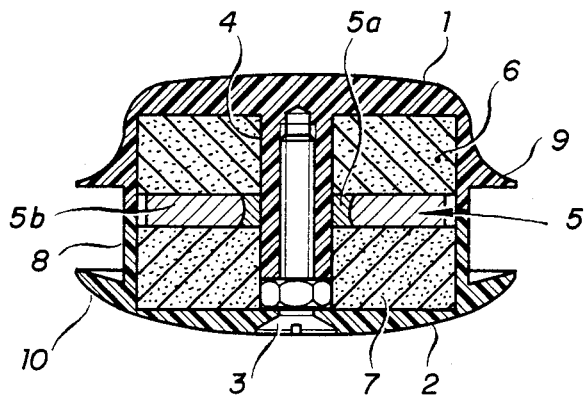
FIG. 1 is an axial cross sectional view of a damping device embodying the invention.

The device illustrated in FIG. 1 comprises a receptacle constituted of two cup-shaped members 1 and 2 which are drawn together by a screw 3 whose head is counter-sunk in the lower member 2 and whose shank threadedly engages a post 4 extending axially within the upper member 1.

The post 4 constitutes a guide member for an oscillating mass 5 which is formed as a disk having an outer portion 5b molded from a heavy metal, for example, lead, onto a collar 5a slidable on the post 4 and consisting of a low friction bearing material. This collar 5a which can be a metal, for example brass, or a synthetic resin, for example nylon, can be cast or injection molded in the disk.

The oscillating mass 5 is positioned on the post 4 between two rings 6 and 7 of a polymeric foam, preferably of an elastomeric material, braced between the bottoms of the cup-shaped housing members 1, 2 and the juxtaposed surfaces of the disk 5b.

The external configuration of the receptacle at its central portion 8 is cylindrical and coaxial with the post 4. This central portion 8 is delimited by two flanges 9 and 10 extending laterally from the upper and lower cups 1 and 2 and can be received in a circular hole formed in the blade 11 of the ski (FIG. 2) at the front end thereof. This hole has been represented at 11a and has its axis extending prependicular to the longitudinal axis of the ski. When the two cups are drawn together by tightening of the screw 3, the flanges 9 and 10 form sealing lips which engage the upper and lower faces of the screw and seal against these surfaces to prevent accumulation of snow therein.

The receptacle is molded of a material sufficiently supple, such as nylon 6,6 to enable the lips 9 and 10 to deform to adjust to the surfaces of the non planar front of the ski.

Figure 2:
FIG. 2 is a side elevational view of the front end of a ski blade provided with this device.

FIG. 2 shows to scale the ski and the damping device. As can be seen from this Figure, the total thickness of the damping device is of the order of 3 times the thickness of the blade 11 of the ski and the lower cup 2 projects downwardly below the surface of the ski by less than the thickness thereof whereas the upper cup 1 projects from the upper surface of the ski by about 1.5 to two times the thickness thereof. The total weight of the device is of the order of 20 to 25 grams so that the modification of the weight distribution of the ski caused by the introduction of the device, taking into consideration the material removed in forming the bore 11a, is minimal. The oscillating mass 5 has a weight of 12 grams.

Figure 3:
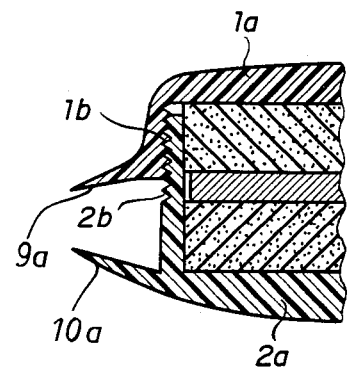
FIG. 3 is a fragmentary cross section similar to FIG. 1 showing a modification thereof.

In the modification illustrated in FIG. 3, the two members 1a and 2a of the receptacle are not connected by a screw 3, but rather have threadedly interconnected parts 1b and 2b defining the external wall of the receptacle. The post can nevertheless be provided. Instead of a screwthread along the outer periphery, the wall of one of the two members defining the receptacle can be formed with undulations parallel to a transverse plane of the receptacle while the internally facing wall of the other member can be provided with complementary undulations or annular serrations. The parts are then driven together axially to lock them together. This simplifies the mounting of the receptacle and prevents them from being taken apart. In this case as well, the two lips 9a and 10a taper outwardly and converge toward one another so that when they are pressed against the respective surfaces of the ski they seal against the latter. This sealing and intimate contact of the receptacle with the ski and the immobility of the receptacle with respect to the ski blade is important for reproducibility of the damping effect.

Various tests on a laboratory scale have been carried out with different oscillating masses and different sponge or foam plastics. In all of the cases the most significant damping effect was measured in the intermediate frequency range between about 100 and 200 Hz. Damping effect at much lower frequencies and at frequencies significantly higher than 200 Hz are of secondary significance.

Figure 4:
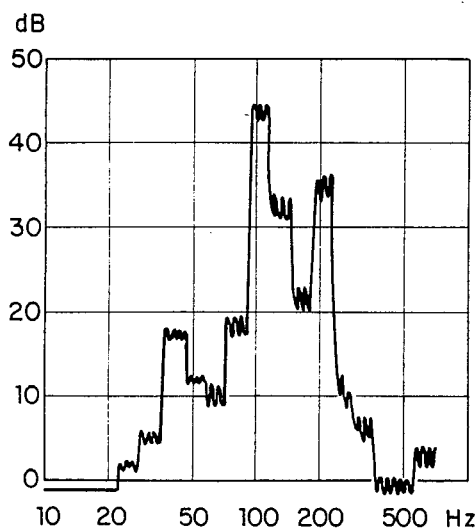
FIGS. 4 and 5 are damping diagrams or graphs in which the frequency spectrum is plotted against the vibration energy respectively for a ski with and a ski without the damping device of the invention.
Figure 5:
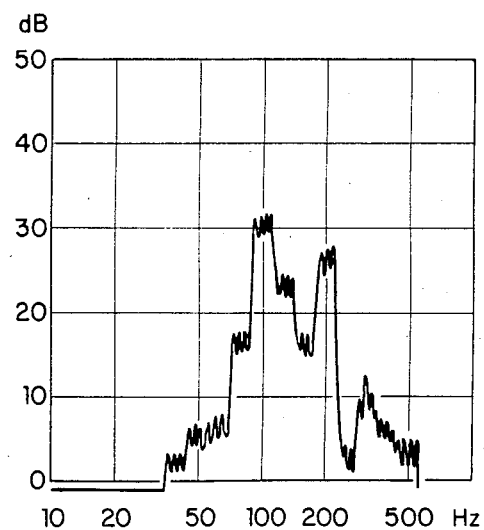

The diagram of FIG. 5 shows the damping effect of the device according to the invention by comparison to the diagram of FIG. 4 for the same ski without damping. In both of these diagrams, the frequency has been plotted along the abscissa while the vibration amplitude is plotted in decibels (dB) along the ordinate.

Both diagrams were produced by fixing the ski in a clamp and exciting the ski with the aid of an eccentric fixed on the shaft of a motor and rotating at 2 to 3 rpm, the eccentric repeatedly engaging an abutment fixed on the ski.

The vibrations were detected by an accelerometer connected to a recording apparatus of the BRUEL and KJAER type.

By comparing the two diagrams and especially the range of frequencies between 100 and 200 Hz, it will be apparent that a reduction of 14 dB is obtained at 100 Hz, of 9 dB at 130 Hz, a reduction of 6 dB is obtained at 160 Hz and a reduction of dB is obtained at 200 Hz.

Each 6 dB of reduction corresponds to a reduction of the acceleration by a factor of 2 so that the damping effect can be seen to be considerable. Below 100 Hz there is a damping at all frequencies and it is only toward 300 HZ that a increase in the energy level can be noted but at these frequencies the amplitude is so small as to be practically negligible.

The diagram of FIG. 5 was made utilizing a damping device with the oscillating mass 5 weighing about 12 grams and in which the polymeric foam rings were composed of a polyester foam of a density of 38 kg per $m^3$. All of the foams tested with a similar structure significantly reduce the energy level of the ski oscillations. Tests were carried out effectively utilizing foam rings which were not precompressed, with disks composed of lead having a thickness of the order 3 millimeters and a diameter of 22 millimeters and a mass of 10 to 12 grams. The axial height of the oscillating assembly total generally about 18 millimeters and the external axial height of the receptacle was about 24 millimeters. The oscillation damper had a nonlinear response and it was found that these dimensions gave the best results where the receptacle was located within the thickness at least partially of the upwardly turned front end of the ski, representing the best mode embodiment of the invention.

It was found, however, that these dimensions could be modified significantly without loss of effect. For example, the mass per unit of surface area could be changed by varying the density of the foam synthetic resin selected so as to maintain the damping characteristics desired. It is also possible to adjust the oscillator as a function of variations in the dimensions and character of the ski. It is also possible to avoid any projection on the upper or lower surfaces of the ski and to provide an aerodynamic shape or a decorative shape to the exposed portions and to consider the exposed portions so that they do not create a problem on crossing of the skies accidentally. Preferably the receptacle has a circular cross section and the disk is also of circular configuration although it is also possible to operate with a polygonal or noncircular mass. In this case, the receptacle can have a conforming shape or a shape corresponding to a circle of a diameter circumscribing the polygon.

It should be noted further that the device can be duplicated to the rear of the ski, i.e. a second damping device can be provided at the rear end of the ski to damp the vibrations at this end. Each device can thus be responsible for damping vibrations on one half of the ski.

We claim:

1. A ski comprising a ski blade and a damping device mounted on said ski blade, said device comprising a receptacle provided with guide means defining an axis of oscillation substantially perpendicular to said blade, and an oscillating assembly in said receptacle including a plate shiftable on said guide means along said axis of oscillation and composed of a material having a specific gravity greater than 10 and having a thickness/diameter ratio between substantially 1/3 and 1/30, and a pair of plastic foam rings disposed on opposite sides of said plate, the ratio between the axial dimension of said plate and the axial length of said assembly being less than substantially 1/4, the mass of said plate and the resilience of said rings being such that said device reduces the accelaration by at least a factor of 2 for a frequency in the range between substantially 100 and 200 Hz.

2. The ski defined in claim 1 wherein the axial dimension of said assembly is at most equal to 4 times the thickness of said blade at the finish portion thereof.

3. The ski defined in claim 1 wherein the ratio of the thickness to the diameter of said plate is between substantially 1/6 and substantially 1/20.

4. The ski defined in claim 3 wherein said plate has a mass of at most 15 grams.

5. The ski defined in claim 2 wherein said device is received at least in part within the thickness of said blade.

6. The ski defined in claim 5 wherein said blade has an upturn front end receiving said device.

7. A ski comprising a ski blade and a damping device mounted on said ski blade, said device comprising a receptacle provided with guide means defining an axis of oscillation substantially perpendicular to said blade, and an oscillating assembly in said receptacle including a plate shiftable on said guide means along said axis of oscillation and composed of a material having a specific gravity greater than 10 and having a thickness/diameter ratio between substantially 1/3 and 1/30, and a pair of plastic foam rings disposed on opposite sides of said plate, the ratio between the axial dimension of said plate and the axial length of said assembly being less than substantially 1/4, the mass of said plate and the resilience of said rings being such that said device reduces the acceleration by at least a factor of 2 for a frequency in the range between substantially 100 and 200 Hz, the axial dimension of said assembly being at most equal to 4 times the thickness of said blade at the finish portion thereof, said device being received at least in part within the thickness of said blade, said blade having an upturn front end receiving said device, said receptacle being formed from two housing portions and having a cylindrical outer wall received in a cylindrical bore of said blade.

8. The ski defined in claim 7 wherein said receptacle projects below the lower face of said blade.

9. The ski defined in claim 8 wherein the height of the receptacle received in the thickness of said blade and projecting below said blade is of the order of 30 to 50% of the total height of the receptacle.

10. The ski defined in claim 7 wherein each of said housing portions is provided with a flange sealing against one of the surfaces of said blades.

11. The ski defined in claim 10 wherein each of said flanges is an outwardly tapering elastically deformable lip forming an acute angle with a transverse plane of the receptacle for effective contact with said surfaces of said blade.

12. The ski defined in claim 7 wherein said portions are formed with interlocking formations nonseparable engaging one another when interconnected from opposite sides of said blade.

13. The ski defined in claim 7 wherein said plate is provided with a sliding bearing slidably engaging said guide means.

14. The ski defined in claim 13 wherein said bearing is surrounded by said plate and said guide means includes a post formed in said receptacle and on which said bearing is slidable.

15. The ski defined in claim 7 wherein the weight of said device is no greater than 30 grams.

16. The ski defined in claim 7 in which the form of said rings has a density less than 80 kg per $m^3$.

17. A ski comprising a ski blade and a damping device mounted on said ski blade, said device comprising a receptacle provided with guide means defining an axis of oscillation substantially perpendicular to said blade, and an oscillating assembly in said receptacle including a plate shiftable on said guide means along said axis of oscillation and composed of a material having a specific gravity greater than 10 and having a thickness/diameter ratio between substantially 1/3 and 1/30, and a pair of plastic foam rings disposed on opposite sides of said plate, the ratio between the axial dimension of said plate and the axial length of said assembly being less than substantially 1/4, the mass of said plate and the resilience of said rings being such that said device reduces the acceleration by at least a factor of 2 for a frequency in the range between substantially 100 and 200 Hz, said mass being at most 15 grams and at least 10 grams, said receptacle being formed from two housing portions and having a cylindrical outer wall received in a cylindrical bore of said blade.

* * * * *